United States Patent [19]

Waldmann et al.

[11] 4,100,340

[45] Jul. 11, 1978

[54] COPOLYMERS CONTAINING PERFLUOROALKYL GROUPS

[75] Inventors: Karl Waldmann, Bad Soden am Taunus; Gunter Schnabel, Kelkheim, both of Fed. Rep. of Germany

[73] Assignee: Hoechst Aktiengesellschaft, Frankfurt am Main, Fed. Rep. of Germany

[21] Appl. No.: 773,537

[22] Filed: Mar. 2, 1977

[30] Foreign Application Priority Data

Mar. 8, 1976 [DE] Fed. Rep. of Germany ....... 2609462

[51] Int. Cl.$^2$ ............................................. C08F 214/08
[52] U.S. Cl. .............................. 526/245; 260/33.8 F; 428/421; 428/515; 428/535; 428/904
[58] Field of Search ................. 526/245; 260/77.5 CR

[56] References Cited

U.S. PATENT DOCUMENTS

| | | | |
|---|---|---|---|
| 3,378,609 | 4/1968 | Fasick et al. | 526/245 |
| 3,459,696 | 8/1969 | Read | 526/245 |
| 3,491,169 | 1/1970 | Raynolds et al. | 526/245 |
| 3,547,856 | 12/1970 | Tandy | 526/245 |
| 3,637,614 | 1/1972 | Greenwood | 526/245 |
| 3,645,989 | 2/1972 | Tandy | 526/245 |
| 3,645,990 | 2/1972 | Raynolds | 526/245 |
| 3,838,104 | 9/1974 | Hayashi et al. | 526/245 |

*Primary Examiner*—Harry Wong, Jr.
*Attorney, Agent, or Firm*—Connolly and Hutz

[57] ABSTRACT

Copolymers of
(A) perfluoroalkylethyl acrylate $C_nF_{2n+1}CH_2CH_2OCOCH=CH_2$
(B) higher alkyl acrylate $C_mH_{2m+1}OCOCH=CH_2$
(C) vinylidene chloride $CH_2=CCl_2$
(D) acroylbutylurethane $CH_2=CH-CONH-COOC_4H_9$ at the weight ratio of 1(A) : 0.22-0.39(B) : 0.45-0.85(C) : 0.01-0.15(D) $n$ being 6, 8, 10, 12 or 14 and $m$ being a number from 10 to 16.

They are prepared by conventional methods for preparing copolymers and are used as oil - and water repellents for porous materials, especially textile materials.

6 Claims, No Drawings

COPOLYMERS CONTAINING PERFLUOROALKYL GROUPS

It is known to prepare block copolymers and graft copolymers that are soluble in chlorinated hydrocarbons, from (meth)acrylates containing perfluoroalkyl groups with different unsaturated compounds (U.S. Pat. No. 3,068,187). However, the preparation is costly and complicated, since homopolymers being formed unavoidably, have to be split off. It is also known to emulsify subsequently in chlorinated hydrocarbons aqueous polymer dispersions of (meth)acrylates containing perfluoroalkyl groups (German Offenlegungsschrift No. 2 460 142). But these emulsions have only a limited storage stability and cannot be applied universally. It has also been suggested to copolymerize (meth)acrylic compounds containing perfluoroalkyl groups with a large number of unsaturated compounds. The thus obtained copolymers, insofar they impart to a substrate oil- and water-repellent properties - are only soluble in F-containing solvents such as 1,2,2-trifluoro-1,2,2-trichloroethane, trifluorotoluene or hexafluoroxylenes, or only in 1,1,1-trichloroethane and/or 1,1,2-trichloroethylene. Only copolymers have been made known so far as perchloroethylene-soluble products, the perfluoroalkyl group of which is bound to the polymerizable (meth)acryl group by a N-substituted sulfonamide radical, and which on the other hand contain octadecylmethacrylate and glycidyl-methacrylate as comonomers (German Offenlegungsschrift No. 1 595 018). If the perfluoroalkyl sulfonamidoalkyl group of this polymer is substituted by a simple perfluoroalkylethyl group, the result is a hardly stable, turbid, emulsion-like copolymer solution having unsatisfactory hydrophobic properties.

It has been found, surprisingly, that copolymers of perfluoroalkylethyl acrylate ($C_nF_{2n+1}CH_2CH_2OCOCH=CH_2$) with
1. decyl to hexadecyl acrylate ($C_{10}H_{21}$—$C_{16}H_{33}OCOCH=CH_2$)
2. vinylidene chloride ($CH_2=CCl_2$) and
3. acroyl butylurethane ($CH_2=CHCONHCOOC_4H_9$)

produce excellent oil- and water-repellent finish results, while being well compatible with perchloroethylene, on porous materials, especially on textiles.

Copolymerization may be carried out in homogeneous solution as a process without isolation of intermediate products. The resulting stock solutions or concentrates are adjusted by simple dilution with perchloroethylene to the desired concentration rate (about 1%), then applied onto the substrate either by spraying, immersion or other known methods. The subsequent drying step may be carried out in the wide temperature range of from room temperature to about 150° C.

For achieving the best possible oil- and water-reppellency from perchloroethylene solutions, said comonomers have to be used upon polymerization at a certain weight ratio, being 1 part perfluoroalkyl ethyl acrylate (A) to 0.22 – 0.39 parts of higher alkyl acrylate (B) to 0.45 – 0.85 parts of vinylidene chloride (C) to 0.01 – 0.15 parts of acroylbutylurethane (D) Preferred ratios are 1.0(A) : 0.24–0.36(B); 0.48–0.80(C) : 0.02–0.14(D), especially of A:B:C:D = 1.0:0.25–0.34; 0.50–0.70; 0.03–0.13.

The usual percompounds and azoic compounds may be used as polymerization initiators. The polymerization temperature varies from room temperature to about 150° C and depends in known manner on the individual polymerization initiator. When using azoisobutyric acid dinitrile, benzoyl peroxide or lauroyl peroxide, preference is given to the temperature range of from 50° to 70° C. For less stable initiators such as diisopropyl percarbonate there will be a tendency to maintain temperatures of from room temperature to about 50° C, while the use of more stable initiators allows higher temperatures. Dibenzoyl peroxide and dilauroyl peroxide are used preferably. Due to the volatility of vinylidene chloride, the copolymerization is better carried out in a closed reaction vessel under inherent pressure (being essentially determined by the vapor pressure of vinylidene chloride); however, if the cooling facilities are adequate, the process may be carried out also under normal pressure. As solvents for the copolymerization process may be used in principle, esters, ethers and (halogenated) hydrocarbons or mixtures thereof. In view to future use, chlorinated aliphatic hydrocarbons are preferred. Good results have been obtained by adding a minor quantity of a low-molecular ester such as ethyl acetate and/or butyl acetate, provided that this ester component will not be a handicap for the intended use neither by its quantity nor by its properties. Therefore, suitable solvents include: methylene chloride, 1,1,1-trichloro ethane, 1,1,2-trichloroethylene, tetrachloroethylene, chloroform and/or carbon tetrachloride with our without addition of ethyl acetate and/or butyl acetate.

Perfluoroalkylethyl acrylate $C_nF_{2n+1}CH_2CH_2OCOCH=CH_2$ is usually a mixture of the individual components, n being 6, 8, 10, 12 and 14 (the preferred quantitative proportion is approximately 30:35:25:10) and is obtained according to known processing methods. It is also possible to use uniform perfluoroalkylethyl acrylates such as $C_8F_{17}CH_2CH_2OCOCH=CH_2$.

The higher alkyl acrylate may be a uniform product of formula $C_mH_{2m+1}OCOCH=CH_2$ (m being 10 to 16), or may consist of a mixture with various values for m. Preference is given to dodecyl acrylate, which may be obtained by esterification of acrylic acid with industrial dodecyl alcohol with small portions of $C_{10}$-, $C_{14}$-, $C_{16}$-, and optionally $C_{18}$-alcohols. Acroyl butylurethane is known from German Auslegeschrift No. 1,145,574.

The perchloroethylene solutions of these copolymers allow the oil- and water-repellent finish of ready-to-wear garments made of woven or non-woven textiles or of leather, and also of the corresponding materials not yet cut and sewn. It is especially possible to impart an oil- and water-repellent finish to garments under the machinery conditions of dry-cleaning. Heating the impregnated textiles to about 150° C produces repellency resistance to dry cleaning and washing processes. It is also possible to impart oil- and water-repellent properties to articles made of wood, paper, mineral masses, plastics etc., by means of solutions of the novel copolymers.

The copolymer solutions of the present invention may also be applied onto garments made of fabrics or leather and onto upholstered furniture etc., by means of household Aerosol spray bottles.

Moreover, known perchloroethylene-soluble hydrophobization agents may be added to the impregnating solutions.

The following Examples illustrate the invention:

EXAMPLE 1

62.5 parts by weight of $C_nF_{2n+1}CH_2CH_2OCOCH=CH_2$ (including about 30 weight % $n = 6$, 36 weight % $n = 8$, 25 weight % $n = 10$, and 10 weight % $n = 12$), 17.5 parts by weight of $C_{12}H_{25}OCOCH=CH_2$, 6.2 parts by weight of $C_4H_9OCONHCOCH=CH_2$, 37.5 parts by weight of $CH_2=CCl_2$, 2.5 parts by weight of dilauroyl peroxide, 50 parts by weight of n-butylacetate and 50 parts by weight of 1,1,1-trichloroethane (methyl chloroform) were stirred together under a continuous flow of nitrogen. A dry-ice isopropanol cooling means prevents leaking off of vinylidene chloride. After about 15 minutes the temperature is slowly increased and maintained at 50° C for 10 hours, at 60° C for another 10 hours and at 70° C for 5 more hours, while the nitrogen flow is stopped to form a stagnant nitrogen atmosphere. Subsequently the viscous solution is blended with 100 parts by weight of 1,1,1-trichloroethane and distilled at the descending cooling device for eliminating the vinylidene chloride residual monomers. As the result were obtained about 50 parts by weight of 1,1,1-trichloroethane-distillation product with 1% of residual vinylidene chloride. The trichloro ethane containing vinylidene chloride which had been distilled off was re-used for the next polymerization batch. The polymer solution remaining in the reaction vessel was diluted with 584 parts by weight of perchloroethylene and packed for storage. The yield was 860 parts by weight of polymer solution with a body of about 14.5 weight %. The solution contained 4.5 weight % of fluorine being bound organically.

EXAMPLE 1a

The process was carried out according to Example (1), however using 2.5 g of dibenzoyl peroxide instead of dilauroyl peroxide. The result was identical.

EXAMPLE 2

The applied quantities and periods were identical to those of Example 1. The processing method was modified insofar that operation took place in a glass autoclave and that after having filled this autoclave, the air was evacuated by forcing in nitrogen under 5 atmospheres gauge and by then relaxing five consecutive times. Upon the last relaxing step the nitrogen pressure was reduced to 0.2 atm. gauge only and the polymerization was initiated by heating. At the beginning the pressure rose to about 0,9 atm. gauge and fell towards the end of the polymerization to 0.6 atm. gauge. The result were the same quantities as obtained in Example (1).

EXAMPLES 3 - 20

62.5 g of perfluoroalkylethyl acrylate having the composition as stated in Example (1), 2.5 g of dilauroyl peroxide, 50 g of butylacetate, 50 g of 1,1,1-trichloroethane and the additional components stated in the following Table I were subjected to polymerization at 50° C for 10 hours, at 60° C for another 10 hours, and at 70° C for 5 more hours according to Example (1). After having eliminated the vinylidene chloride residual monomers, the polymer concentrates were diluted with perchloroethylene to 860 g. 70 g each of these perchloroethylene stock solutions werde further diluted with 950 ml of perchloroethylene for textile processing purposes, the result corresponding to a fluorine content of 0.3 weight % of F/l and to a solid content of approximately 1 weight % per liter. As shown in Table I, the polymer solutions nos. 17, 18, 19 and 20 yielded only turbid and unstable dilutions, while the dilutions nos. 11, 12 and 13 (range-finding compositions) were not perfectly clear, but remained stable for a very long time. The other dilutions were clear solutions.

Table I:

[a] according to the G(ew). V(erh). W(eight) P(roportion) invention $= \left( \frac{g\ Comonomer}{g\ F-acrylate} \right)$:

| No. | alkylacrylat | g | WP | Vinylidenechloride g | Vinylidenechloride WP | acroylbutylurethane g | acroylbutylurethane WP | dilutability with perchloroethylene |
|---|---|---|---|---|---|---|---|---|
| 3 | $C_{12}$-Acrylat | 17,5 | 0,28 | 45,0 | 0,72 | 6,25 | 0,10 | + |
| 4 | " | 21,0 | 0,34 | 30,0 | 0,48 | " | " | + |
| 5 | " | 17,5 | 0,28 | 37,5 | 0,60 | 3,13 | 0,05 | + |
| 6 | " | 15,0 | 0,24 | 37,5 | 0,60 | 6,25 | 0,10 | + |
| 7 | " | 17,5 | 0,28 | " | " | 7,50 | 0,12 | + |
| 8 | " | " | " | " | " | 4,60 | 0,07 | + |
| 9 | " | " | " | 30,0 | 0,80 | 6,25 | 0,10 | + |
| 10* | $C_{16}$ Acrylat | " | " | 37,5 | 0,60 | 6,25 | 0,10 | + |
| 11 | $C_{12}$ Acrylat | " | " | 30,0 | 0,48 | 6,25 | 0,10 | 0 |
| 12 | " | " | " | 37,5 | 0,60 | 9,38 | 0,15 | 0 |
| 13 | $C_{10}$ Acrylat | " | " | " | " | 6,25 | 0,10 | 0 |

[b] not according to the invention:

| No. | alkylacrylat | g | WP | Vinylidenechloride g | Vinylidenechloride WP | acroylbutylurethane g | acroylbutylurethane WP | dilutability with perchloroethylene |
|---|---|---|---|---|---|---|---|---|
| 14 | $C_{18}$-acrylate | 17,5 | 0,28 | 37,5 | 0,60 | 6,25 | 0,10 | + |
| 15 | $C_{12}$-acrylate | " | " | — | — | — | — | + |
| 16 | " | 25,0 | 0,40 | " | " | 6,25 | 0,10 | + |
| 17 | $C_6$-acrylate | 17,5 | 0,28 | " | " | " | " | — |
| 18 | $C_8$-acrylate | " | " | " | " | " | " | — |
| 19 | $C_{12}$-acrylate | 12,5 | 0,20 | " | " | " | " | — |
| 20 | $C_{12}$-methacrylate | 17,5 | 0,28 | " | " | " | " | — |

*in that case the $C_nF_{2n+1}CH_2CH_2OCOCH=CH_2$ consisted of about 6 Wt. % n=6, 50 Wt. % n=8, 28 Wt. % n=10, 15 Wt. % n=12 and 1 Wt. % n=14

Samples of cotton fabrics were immersed into the perchloroethylene solutions (0.3 weight % of F), centrifuged and after drying heated to 150° C for 4 minutes. The oil-repellency is determined according to the test method AATCC 118-1966, the water-repellency was determined according to AATCC-22-1952.

Table II

| Example No. | Oil | Water | Example No. | Oil | Water |
|---|---|---|---|---|---|
| 1 | 6 | 100 | 9 | 6 | 100 |
| 2 | 6 | 100 | 10 | 6 | 100 |
| 3 | 6 | 100 | 11 | 6 | 100 |
| 4 | 6 | 100 | 12 | 6 | 100 |
| 5 | 6 | 100 | 13 | 6 | 100 |
| 6 | 6 | 100 | 14 | 6 | 80–90 |

Table II-continued

| Example No. | Oil | Water | Example No. | Oil | Water |
|---|---|---|---|---|---|
| 7 | 6 | 100 | 15 | 6 | 80 |
| 8 | 6 | 100 | 16 | 6 | 80-90 |

The solutions 14, 15, 16 which are not within the scope of this invention though being clear, yield bad hydrophobization values. Pieces of polyamide fabrics were immersed into perchloroethylene solutions of 20 g/l of the stock solutions (0.09 weight % of F/l in the treating liquor) and after centrifugation air-dried at room temperature.

Table III

| No. | Oil | Water |
|---|---|---|
| 1-13 | 6 | 100 |
| 14 | 6 | 90 |
| 15 | 6 | 90 |
| 16 | 6 | 90 |

It is thus evident that lower hydrophobic values are obtained without acroylbutylurethane and upon substitution of dodecyl acrylate by octadecyl acrylate.

EXAMPLES 21 – 26

62.5 g of perfluoroalkyl ethyl acrylate according to Example (1), 2.5 g of dilauroyl peroxide, 17.5 g of dodecyl acrylate, 37.5 g of vinylidene chloride, 6.2 g of acroylbutylurethane were polymerized according to Example (1) at 50° C for 10 hours, at 60° C for another 10 hours and at 70° C for 5 more hours, in the following solvents or solvent mixtures

| No. | solvent |
|---|---|
| 21 | 100 g of 1,1,1-trichloroethane |
| 22 | 100 g of perchloroethylene + 40 g of ethyl acetate |
| 23 | 100 g of methylene chloride |
| 24 | 100 g of carbon tetrachloride + 40 g of n-butyl acetate |
| 25 | 100 g of chloroform |
| 26 | 100 g of trichloroethylene + 20 g of ethyl acetate |

After distillation of the batch and dilution with perchloroethylene under the aforementioned conditions oil-repellency rates of 6 and water-repellency rates of 100 were obtained on polyamide fabric samples.

EXAMPLE 27

Instead of the perfluoroalkyl acrylate mixture indicated in Example (1a) polymerization was carried out with the uniform monomer $C_8F_{17}CH_2CH_2OCOCH=CH_2$ according to the process described in this Example. The resulting polymer solution yielded after dilution very good oil-repellency and water-repellency values on fabric samples made of polyamide, polyester and cellulose alike (oil 6, water 100).

COMPARATIVE EXAMPLES:

(a) A commercial product (determined by analyses as the 1,1,1-trichloroethane-solution of a copolymer of octadecyl methacrylate and N-alkyl perfluorooctylsulfonamidoalkyl methacrylate containing 4.5 weight % of F) was examined at identical fluorine content in comparison to the polymer solution of Example 2, both applied onto cotton-polyester-mixed fabric. Immersion is followed by squeezing up to a liquor pick-up of 130 weight % and a drying step which is followed by heating to 150° C for a 4 minutes' period:

| 0.1 weight % of fluorine in the solution: | oil | water |
|---|---|---|
| commercial product | 1 | 50/70 |
| product according to Example 2 | 3 | 90/100 |
| 0.2 weight % of fluorine in the solution: | | |
| commercial product | 3 | 70 |
| product according to Example 2 | 4 | 100 |

(b) Example 8 of German Offenlegungsschrift no. 1,595,018 was repeated modified insofar that the monomer IV, $C_8F_{17}SO_2N(CH_3)C_{11}-H_{22}OCOC(CH_3)=CH_2$, mentioned therein is replaced by the same quantity of $C_nF_{2n+1}CH_2CH_2OCOC(CH_3)=CH_2$ (30 weight % $n = 6$, 35 weight % $n = 8$, 25 weight % $n = 10$, 10 weight % $n = 12$). The resulting polymer stock solution displayed a turbid, emulsion-like aspect.

(c) When using $C_nF_{2n+1}CH_2CH_2OCOCH=CH_2$ ($n = $ see above) and $C_{18}H_{37}OCOCH=CH_2$ according to the same process, a clear polymer stock solution was obtained.

At identical F content polyamide fabrics showed the following repellency values:

| | oil | water |
|---|---|---|
| comparative product according to b) | 6 | 50 |
| comparative product according to c) | 6 | 50 |
| comparative product according to Example 2 | 6 | 100 |

(d) According to the data and claims of German Patent no. 1,248,945 31 g of perfluoroalkylethyl acrylate, 31 g of freshly distilled chloroprene, 0.25 g of dodecyl mercaptan and 0.5 g of dilauroyl-peroxide in 200 g of perchloroethylene were polymerized under nitrogen at 50° C for 10 hours, at 60° C for another 10 hours and at 70° C for 5 more hours. Cooling was followed by dilution with perchloroethylene to 430 g. Examination of the body determined only 6% instead of 14% as calculated. Fabric samples did not exhibit any repellency neither against oil nor against water.

What is claimed is:
1. Copolymers of
   (A) perfluoroalkylethyl acrylate
     $C_nF_{2n+1}CH_2CH_2OCOCH=CH_2$
   (B) higher alkyl acrylate
     $C_mH_{2m+1}OCOCH=CH_2$
   (C) vinylidene chloride $CH_2 = CCl_2$
   (D) acroylbutylurethane
     $CH_2=CH-CONHCOOC_4H_9$
   at the weight ratio of
     1(A) : 0.22–0.39(B) : 0.45–0.85(C)–0.01–0.15(D)
   $n$ being 6, 8, 10, 12 or 14 and $m$ being a number from 10 to 16.
2. Copolymers according to claim 1 at the weight ratio of
     1(A) : 0.24–0.36(B) : 0.48–0.80(C) : 0.02–0.14(D).
3. Copolymers according to claim 1 at the weight ratio of
     1(A) : 0.25–0.34(B) : 0.50–0.70(C) : 0.03–0.13(D).
4. A process for the manufacture of copolymers having oil- and water-repellent properties comprising the copolymerization of the monomers recited in claim 1 at the weight ratios specified in claim 1 in a homogeneous solution.
5. A process according to claim 4, comprising the polymerization of the monomers specified in claim 2 at the above specified weight ratios.
6. A process according to claim 4, comprising the polymerization of the monomers at the weight ratios stated in claim 3.